UNITED STATES PATENT OFFICE.

GODFREY STEERUP, OF CHICAGO, ILLINOIS, ASSIGNOR TO U. S. LIGHT & HEAT CORPORATION, OF NIAGARA FALLS, NEW YORK, A CORPORATION OF NEW YORK.

STORAGE-BATTERY SEPARATOR.

1,416,761.  Specification of Letters Patent.  Patented May 23, 1922.

No Drawing.  Application filed August 11, 1919. Serial No. 316,832.

*To all whom it may concern:*

Be it known that I, GODFREY STEERUP, a citizen of the United States, residing at Chicago, in the county of Cook and State of Illinois, have invented new and useful Improvements in Storage-Battery Separators, of which the following is a specification.

The present invention relates to storage battery separators.

More particularly the present invention relates to storage battery separators and improved methods of manufacturing the same. A separator should be composed of practically non-conducting material but should be sufficiently porous to permit the circulation of electrolyte therethrough.

An object of the present invention is to provide a method for manufacturing storage battery separators, which method will be cheap and which will result in an improved separator.

Further objects will appear as the description proceeds.

In carrying out the present invention, non-conducting material, as for instance kieselguhr or diatomaceous earth, in powdered form, is formed into a block. This powdered, non-conducting material should have incorporated with it electric conductors, which may be in either solid or liquid form, the conductors having sufficient conductivity to carry a current through said block when a relatively high potential is applied thereto. In order to form a block, it will be necessary to use a binder with the powdered material. For this purpose there may be used paraffin or high melting pitch, or any compound which, under the influence of heat or electric current, will become a binder. The conductors used may be graphite, sulphuric acid or any other conductor, such for instance as metallic copper or metallic iron.

Porosity within the block may be produced by the action of the electric current. The conductor employed may be such that it will gasify under the influence of the electric current and produce porosity. In this case the operation should be carried on in a closed vessel sufficiently strong to withstand the very high pressures which will be caused by the gases produced. If preferred, the conductors may be of non-gasing nature in which case the binder may be relied upon to gasify to produce porosity.

The melting of the binder under the influence of the electric current will cause the fusing of the material into a solid coherent block which may be cut up into separators. Before the separators are put into service, care should be observed that no electric conductors are left therein. If the conductors used are of such a nature that they are not removed or destroyed by the action of the electric current, they should be removed in some other manner. For example, if metallic copper or metallic iron is used as a conductor, it may be leached out.

The resulting separator will stand up in service, will permit circulation of the electrolyte and will prevent striking across from one plate to another plate of opposite polarity.

One embodiment of the present invention has been described in detail. Many modifications will occur to those skilled in the art. It is intended in this patent to cover all such modifications that come within the scope of the invention as defined by the appended claims.

What I claim as new and desire to secure by Letters Patent of the United States, is—

1. The method of preparing storage battery separators which consists of making a mass of non-conducting material interspersed with electrical conductors, applying an electrical current to said conductors to fuse said mass into a coherent block, said mass being provided with a substance which will gasify under the influence of the electric current.

2. The method of preparing storage battery separators which consists of mixing powdered non-conducting material with a binding substance and with electrical conductors, applying an electric current to said conductors, thereby forming a coherent block, and eliminating said conductors.

3. The method of preparing storage battery separators which consists of making a mass of non-conducting material having mixed therewith a substance which will gasify under the influence of heat and heating said mass to fuse same into a coherent porous block.

4. The method of preparing storage battery separators which consists of making a fusible mass of non-conducting material interspersed with electrical conductors, applying a heating electric current to said mass by means of said conductors and substantially eliminating said conductors.

5. The method of preparing battery separators which consists in providing a fusible mass of non-conducting material mixed with material which will gasify under the influence of heat and interspersed with electric conductors, applying a heating electric current to said mass by means of said conductors, and substantially eliminating said conductors.

6. The method of preparing storage battery separators which consists in making a mass of non-conducting material having mixed therewith a substance which under the action of heat will become a binder for said material and heating said mass to fuse the same into a coherent porous block.

7. The method of preparing storage battery separators which consists in making a mass of non-conducting material having mixed therewith a substance which under the action of electric current will become a binder for said material, and passing the electric current therethrough to convert said mass into a coherent porous block.

In witness whereof, I have hereunto subscribed my name.

GODFREY STEERUP.